United States Patent [19]

Lustig et al.

[11] 4,230,502

[45] Oct. 28, 1980

[54] BUILDING MATERIAL ADDITIVE

[75] Inventors: Klaus P. Lustig, Paderborn, Fed. Rep. of Germany; Louris Kaper, Barneveld, Netherlands

[73] Assignee: Akzona Incorporated, Asheville, N.C.

[21] Appl. No.: 2,167

[22] Filed: Jan. 9, 1979

[30] Foreign Application Priority Data

Jan. 18, 1978 [DE] Fed. Rep. of Germany ....... 2801932

[51] Int. Cl.$^3$ ............................................... C04B 7/35
[52] U.S. Cl. ................................................... 106/314
[58] Field of Search ............................ 106/91, 93, 314

[56] References Cited

U.S. PATENT DOCUMENTS

| | | | |
|---|---|---|---|
| 1,910,419 | 5/1933 | Amon | 106/90 |
| 3,826,663 | 7/1974 | Minicozzi et al. | 106/314 |
| 4,003,431 | 1/1977 | Novotny et al. | 106/314 |
| 4,125,410 | 11/1978 | Natsuume | 106/314 |

*Primary Examiner*—James Poer
*Attorney, Agent, or Firm*—Francis W. Young; Robert F. Green

[57] ABSTRACT

A building material additive comprising an aqueous dispersion of a hydrophobic constituent which is completely wetted with a surfactant, and a water-soluble polymer is disclosed. The dispersion may also contain air void formers, retardants, plasticizers, accelerators, or the like, or mixtures thereof.

8 Claims, No Drawings

BUILDING MATERIAL ADDITIVE

BACKGROUND OF THE INVENTION

The invention relates to a building material additive in the form of an aqueous dispersion, containing air void formers, retardants, plasticizers, accelerators, or the like, or a mixture thereof, as well as to a process for the preparation thereof.

Additives have for some time been mixed with building materials to improve processing and to influence the solidification behavior and solidification time. Although they have the same or a similar effect in the building material, these additives belong, in general, to widely differing categories of chemical substances. Frequently it is desirable to affect a building material in several ways with an additive, or mixture of additives. Difficulties often arise in reconciling the extent of the desired effects, so that compromises are necessary and some additives cannot reach full effectiveness. Some additive combinations are not possible because in direct contact with one another they are incompatible. In general, the effectiveness of the additives is proportional to the concentration used but the proportionality does not follow a linear dependence. If incompatible additives are utilized, the result will be undesirable because the additives will not be distributed in the building material with sufficient homogeneity and, as a consequence, the effect of the additives will be stronger in some places, whereas in other parts of the mixture their effectiveness will be too low. The effect of the additives is to a considerable extent temperature-dependent, so that various combinations have to be chosen depending upon the season and the mean outside temperature.

When air void formers are combined with other additives, one can observe that the stability of the air voids is impaired. This results in too low a content of air voids, which have in general a relatively large diameter, and unfavorable spatial distribution of the air voids because especially those located in the vicinity of the surface display a tendency to escape before the solidification process has taken place.

An object of the present invention is thus to find a building material additive in which the effectiveness of the active ingredients used will be enhanced.

SUMMARY OF THE INVENTION

The foregoing object is accomplished by a building material additive comprising a dispersion of a hydrophobic substance completely wetted by a surfactant, and a water-soluble polymer.

DETAILED DESCRIPTION OF THE PREFERRED EMBODIMENTS

Preferably, the dispersion of the present invention contains from about 0.1 to about 5%, by weight, of a hydrophobic substance and from about 0.01 to about 2%, by weight, of a water-soluble polymer, in each case referred to the total weight of the dispersion.

Examples of the hydrophobic substances suitable for use in the building material additive pursuant to the present invention are alkaline earth soaps of higher fatty acids, silicone oils, silicone greases, and mineral oils. However, because of the good results, preference is given to solid substances with a particle size from about 0.01 to about 100 u, which either are already hydrophobic as such, or have been made hydrophobic in a customary manner, as by treatment with dimethyl dichlorosilane. Suitable hydrophobic solids are minerals that have been made hydrophobic, such as hydrophobic clay, hydrophobic vermiculite, or other silicates that have been made hydrophobic. A very well suited hydrophobic substance within the framework of the present invention has been found to be carbon, in the form of graphite, as well as lamp black. Furthermore, particles of plastic materials made hydrophobic, such as polytetrafluoroethylene powder, have been found to be well suited for use in the dispersion pursuant to the present invention.

Surfactants suitable for wetting the hydrophobic substances completely can be used without limitation in the building material additive, no matter whether it is anion-active, cationactive, or non-ionogenic. Because of the proportionally small quantities needed for complete wetting, the surface-active agents preferably used for the building material additives pursuant to the present invention are sulfonated or sulfated alkyl, alkylaryl or polyalkylene oxide compounds, or mixtures thereof.

Among the water-soluble polymers useful in the dispersion pursuant to the present invention are, for example, polyacrylates, carboxymethyl cellulose, hydroxymethyl cellulose, polyethylene oxides, or partially saponified polyvinyl acetate. However, the best results were obtained with alginates.

Pursuant to the present invention, the building material additives are prepared by completely wetting a hydrophobic substance with a surface-active agent, mixing the resultant substance with the additives such as air void formers, retardants, plasticizers, accelerators, or the like, or mixtures thereof, and adding a water-soluble polymer and water to form a stable dispersion. A dispersion is considered stable, if no settling occurs within a period of 3 months.

Because of the complicated colloid-chemical and electrokinetic processes taking place after the addition of the additive pursuant to the present invention to cement-sand-water mixtures, surprising advantages will result. Over a wide concentration range, the effectiveness of the additive becomes far-reachingly independent from the concentration of the active ingredients added. The added active ingredients are approximately equally effective within a wide temperature range, so that changes in application dependent upon the season become unnecessary. With the dispersion pursuant to the invention, the influence of the finest particle constituents in the sand clearly remains nominal, so that it is possible to be relatively independent of the finest particle constituent in the sand when using the building material additive pursuant to the present invention.

The building material additive pursuant to the present invention can be advantageously used with concrete, light-weight concrete, aerated concrete, freeze-proof and dew salt-resistant concrete, with slowly solidifying and processing-constant mortar, which thus remains trowelable for an extended period, as well as with stucco mortar, e.g. in order to obtain a desired, predetermined content of air voids, to influence the solidification time, or to improve the flowability.

The invention is explained further by the following nonlimiting examples.

A mortar, consisting of 150 kg Portland cement PZ 350 F, 150 kg trass as filler, 720 kg sand of a grain size of 0 to 4 mm and 720 kg sand of a grain size of 0 to 1 mm, as well as 175 liters of water, was prepared for each of Examples 1 to 5. The volume of the mortar was about 1 m³, into which the appropriate additive solutions, or dispersions, were mixed. The air voids in, and solidification behavior of, the mortar of Examples 1 to 5 were investigated and compared with one another.

EXAMPLE I (COMPARATIVE EXAMPLE)

2.0, 2.5 and 3.0 liters of a commercial mortar additive consisting of about equal parts of an air void former and a solidification retardant were in each case mixed into 1 m³ of the above-described mortar. The results are contained in Table I.

EXAMPLE II (COMPARATIVE EXAMPLE)

2.0, 2.5 and 3.0 liters of another commercial additive, which consisted of a solution of a hydroxyethylene cellulose and a salt were in each case mixed into 1 m³ of the above-described mortar. The results are contained in Table I.

EXAMPLE III 2.0, 2.5 and 3.0 liters of an additive pursuant to the present invention were in each case mixed into 1 m³ of the mortar described above. The additive was prepared in the following manner: 1 part by weight of a hydrophobic silicium dioxide was slowly stirred with 5 parts by weight of laurylether sulfate, until the surface of the silicium dioxide was completely wetted. This mixture was mixed homogeneously with 20 parts by weight of sodium gluconate and 5 parts by weight of sodium tripolyphosphate. Then, 0.2 parts by weight of sodium alginate were added and, after a homogeneous blend has been obtained, the mixture was dispersed into 69 parts by weight of water. A stable dispersion was formed, in which no change was observable after 3 months. The results are compiled in Table I.

EXAMPLE IV

The one part of silicium dioxide in Example II is replaced by one part by weight of hydrophobic calcium stearate. The results obtained are listed in Table I.

EXAMPLE V

The one part by weight of silicium dioxide in Example III is replaced by one part by weight of hydrophobic graphite. The results obtained are listed in Table I.

The results compiled in Table I indubitably show, that with the dispersions pursuant to the invention (Examples III, IV and V) there is indeed a change in solidification times, but not in air void content, with the building material additive concentration. However, it is additionally found that, compared with the tested commercial additives, the size distribution of air void diameters has a substantially narrower range with the building material additives pursuant to the invention and is also shifted toward smaller air void diameters. This shows the greater stability of air voids during the solidification period.

The difference between the size distribution of air void diameters with customary products and the products pursuant to the invention is best shown by vibrating the freshly prepared mortars containing air voids for an extended period of time. This vibration eliminates the normally present thixotropy of the mortar and, because of their lower density, the air voids (AV) begin to rise to the surface. Thereby, the ascending velocities depend very much upon the diameter of the voids. Thus, the voids with the greatest diameters reach the surface first. When the AV content still present in the mortar is measured after certain vibration times, one finds that, in the case of mortars containing a customary additive, the reduction in AV content is about 8 to 10%, while in mortars containing the same quantity of a product pursuant to the invention it is 3 to 5%. During vibrating one could clearly recognize, that the air voids escaping in the first case were coarse and unstable, which showed itself by immediate bursting of the bubbles. In the second case, a small quantity of finely porous foam was formed, which was stable for quite some time. Since an increased AV content is also accompanied by a reduction in gross density, an investigation was carried out to determine whether the data found for mortar are also applicable to light-weight concrete.

EXAMPLE VI

Since, in the installation of light-weight concrete, the lower coarse grain often migrates to the surface of the concrete due to vibration, so that segregation will occur, a reduction in the gross density of the mortar present in the concrete has to counteract segregation. For this reason, a light-weight concrete of the following composition was prepared:
 615 kg light-weight concrete admixture 0/4 mm
 415 kg light-weight concrete admixture 4/16 mm
 340 kg Portland cement
 170 lit. water 3 liters/m³ of the dispersion pursuant to the invention (according to Example V) were added to one batch of concrete, while another batch did not contain any additive. After vibrating the batches of concrete for 1 min. it was found that the batch made without additive had a gross density of 1.70, whereas the batch mixed with the dispersion pursuant to the invention had a gross density of 1.4. After a vibrating time of 10 min., the gross density of the comparison concrete had gone up to 1.75, whereas the gross density of the concrete mixed with the additive had risen to only 1.5. The cutting surfaces of the batches of concrete showed clearly that, in the comparison concrete, there had been migration of the coarsest grain, whereas the batch of concrete mixed with the dispersion pursuant to the invention displayed a good homogeneity.

EXAMPLE VII

In order to demonstrate the absence of a dependence of the effect of the dispersion pursuant to the invention upon the type of binder, a stucco mortar was prepared, in which, as is customary, the binder consisted not only of cement, but also of a larger quantity of hydrated lime. The composition of the stucco was a follows:
 200 kg cement
 100 kg lime
 1250 kg sand 0/2 mm
 200 kg water
 3 liters of dispersion accdg. to Example 5.

The freshly prepared stucco contained 24% by volume of air, i.e. the air content was on the same level as the air void quantities listed for Examples III, IV, and V. Adhesion to the base showed a distinct improvement compared with a stucco prepared in the same manner, but without the dispersion. Even after an extended standing time, the stucco material containing the dispersion pursuant to the invention did not give off any water, and processability was substantially better for a longer period of time, than with stucco mortar without an addition of dispersion.

TABLE I

| Example | Additive 1000 cc/m$^3$ | Solidification time, hours | Air voids % | Resistance to crushing n/mm$^2$ after 28 days |
|---|---|---|---|---|
|   | 1.0 | 16 | 14 |   |
|   | 1.5 | 21 | 14 |   |
| 1 | 2.0 | 32 | 15 |   |
|   | 2.5 | 36 | 20 | 3.6 |
|   | 3.0 | 44 | 25 |   |
|   | 1.0 | 21 | 22 |   |
|   | 1.5 | 28 | 26 |   |
| 2 | 2.0 | 32 | 28 |   |
|   | 2.5 | 39 | 32 | 2.9 |
|   | 3.0 | 48 | 33 |   |
|   | 1.0 | 14 | 18 |   |
|   | 1.5 | 22 | 20 |   |
| 3 | 2.0 | 31 | 22 |   |
|   | 2.5 | 37 | 23 | 3.4 |
|   | 3.0 | 40 | 24 |   |
|   | 1.0 | 10 | 18 |   |
|   | 1.5 | 18 | 19 |   |
| 4 | 2.0 | 25 | 22 |   |
|   | 2.5 | 28 | 23 | 3.2 |
|   | 3.0 | 30 | 23 |   |
|   | 1.0 | 22 | 18 |   |
|   | 1.5 | 27 | 25 |   |
| 5 | 2.0 | 31 | 27 |   |
|   | 2.5 | 35 | 28 |   |
|   | 3.0 | 46 | 28 |   |

What is claimed is:

1. A process for the preparation of a building material additive comprising sequentially wetting a hydrophobic constituent with a surfactant, mixing the resultant product with an air void former and optionally with one or more members selected from the group consisting of retardants, plasticizers, and accelerators, and adding a water-soluble polymer and water to form a stable dispersion.

2. The process of claim 1 wherein the hydrophobic constituent is a solid having a particle size between 0.01 and 100 u.

3. The process of claim 2 wherein the hydrophobic constituent is a mineral which has been made hydrophobic.

4. The process of claim 2 wherein the hydrophobic constituent is carbon in the form of graphite or lamp black.

5. The process of claim 2 wherein the hydrophobic constituent is hydrophobic particles of plastic.

6. The process of claim 1, 2, 3, 4, or 5 wherein the surfactant is selected from the group consisting of sulfonated or sulfated alkyl, alkylaryl, and polyalkylene oxide compounds, and mixtures thereof.

7. The additive obtained by the process of claim 1, 2, 3, 4, 5, or 6.

8. The additive of claim 7 wherein the surfactant is selected from the group consisting of sulfonated or sulfated alkyl, alkylaryl, and polyalkylene oxide compounds, and mixtures thereof.

* * * * *